(12) United States Patent
Hidaka

(10) Patent No.: US 10,552,098 B2
(45) Date of Patent: Feb. 4, 2020

(54) IMAGE FORMING APPARATUS AND IMAGE FORMING METHOD

(71) Applicant: CANON KABUSHIKI KAISHA, Tokyo (JP)

(72) Inventor: Keita Hidaka, Tsukuba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/149,644

(22) Filed: Oct. 2, 2018

(65) Prior Publication Data

US 2019/0102117 A1    Apr. 4, 2019

(30) Foreign Application Priority Data

Oct. 4, 2017   (JP) .................................. 2017-194694

(51) Int. Cl.
*G06F 3/12*      (2006.01)
(52) U.S. Cl.
CPC .......... *G06F 3/1205* (2013.01); *G06F 3/1239* (2013.01); *G06F 3/1276* (2013.01)
(58) Field of Classification Search
None
See application file for complete search history.

(56) References Cited

U.S. PATENT DOCUMENTS

| 2005/0024661 | A1* | 2/2005 | Akashi | G06K 15/02 |
| | | | | 358/1.9 |
| 2005/0052675 | A1* | 3/2005 | Higuchi | H04N 1/2307 |
| | | | | 358/1.13 |
| 2007/0211278 | A1 | 9/2007 | Saito | |
| 2011/0222115 | A1 | 9/2011 | Yamamoto | |
| 2011/0261378 | A1 | 10/2011 | Taima | |
| 2011/0261383 | A1 | 10/2011 | Yamamoto | |

FOREIGN PATENT DOCUMENTS

JP            2011188294 A     9/2011

* cited by examiner

*Primary Examiner* — Thomas D Lee
(74) *Attorney, Agent, or Firm* — Canon U.S.A., Inc. IP Division

(57) ABSTRACT

An image forming apparatus includes a storage unit that stores generated image data, a first processing unit that, based on the image data stored in the storage unit and setting information, performs image processing according to a type of sheets stored in a first sheet feed cassette for printing of an Nth copy, a second processing unit that, based on the image data stored in the storage unit and the setting information, performs image processing according to a type of sheets stored in a second sheet feed cassette for printing of an (N+1)th copy, and a printing unit that prints image data processed by the first processing unit on a sheet fed from the first sheet feed cassette, and prints image data processed by the second processing unit on a sheet fed from the second sheet feed cassette.

12 Claims, 18 Drawing Sheets

IMAGE FORMING APPARATUS AND IMAGE FORMING METHOD

BACKGROUND OF THE INVENTION

Field of the Invention

The present invention relates to an image forming apparatus and an image forming method.

Description of the Related Art

Page description language (PDL) data is transmitted from a printer driver of an information processing apparatus to a printing apparatus, and the printing apparatus generates image data from the PDL data and stores the generated image data in a memory. A function called carbon copy in which the stored image data is used and sheets are fed from different sheet feed cassettes for a first copy and a second copy to perform printing is known (see Japanese Patent Application Laid-Open No. 2011-188294). In a case where the carbon copy function is used, a sheet feed cassette for each copy is set using the printer driver, and information of the set sheet feed cassette and the PDL data are transmitted to the printing apparatus.

According to Japanese Patent Application Laid-Open No. 2011-188294, the generated image data is used to print a plurality of copies. However, although the generated image data is used, image processing according to a type of sheets to be fed from each of the different sheet feed cassettes is not performed. Consequently, a suitable amount of toner or color of toner for the sheet may not be used when printing the sheet.

SUMMARY OF THE INVENTION

According to an aspect of the present invention, an image forming apparatus connectable to an information processing apparatus via a network includes a receiving unit configured to receive print data from the information processing apparatus, the print data including setting information in which printing of a plurality of copies is designated and different sheet feed cassettes are set for at least printing of an Nth copy (N is an integer of 1 or greater) and printing of an (N+1)th copy, a generation unit configured to generate image data from the print data received by the receiving unit, a storage unit configured to store the image data generated by the generation unit, a first processing unit configured, based on the image data stored in the storage unit and the setting information, to perform image processing according to a type of sheets stored in a first sheet feed cassette for printing of the Nth copy, a second processing unit configured, based on the image data stored in the storage unit and the setting information, to perform to image processing according to a type of sheets stored in a second sheet feed cassette for printing of the (N+1)th copy, and a printing unit configured to print image data processed by the first processing unit on a sheet fed from the first sheet feed cassette, and to print image data processed by the second processing unit on a sheet fed from the second sheet feed cassette.

Further features of the present invention will become apparent from the following description of exemplary embodiments with reference to the attached drawings.

DESCRIPTION OF THE EMBODIMENTS

Hereinafter, exemplary embodiments will be described in detail with reference to the drawings. The following exemplary embodiments are not intended to limit the scope of the claims of the present invention, and not all of the combinations of the aspects that are described in the following embodiments are necessarily required with respect to a problem to be addressed by the present invention.

Figure 1:
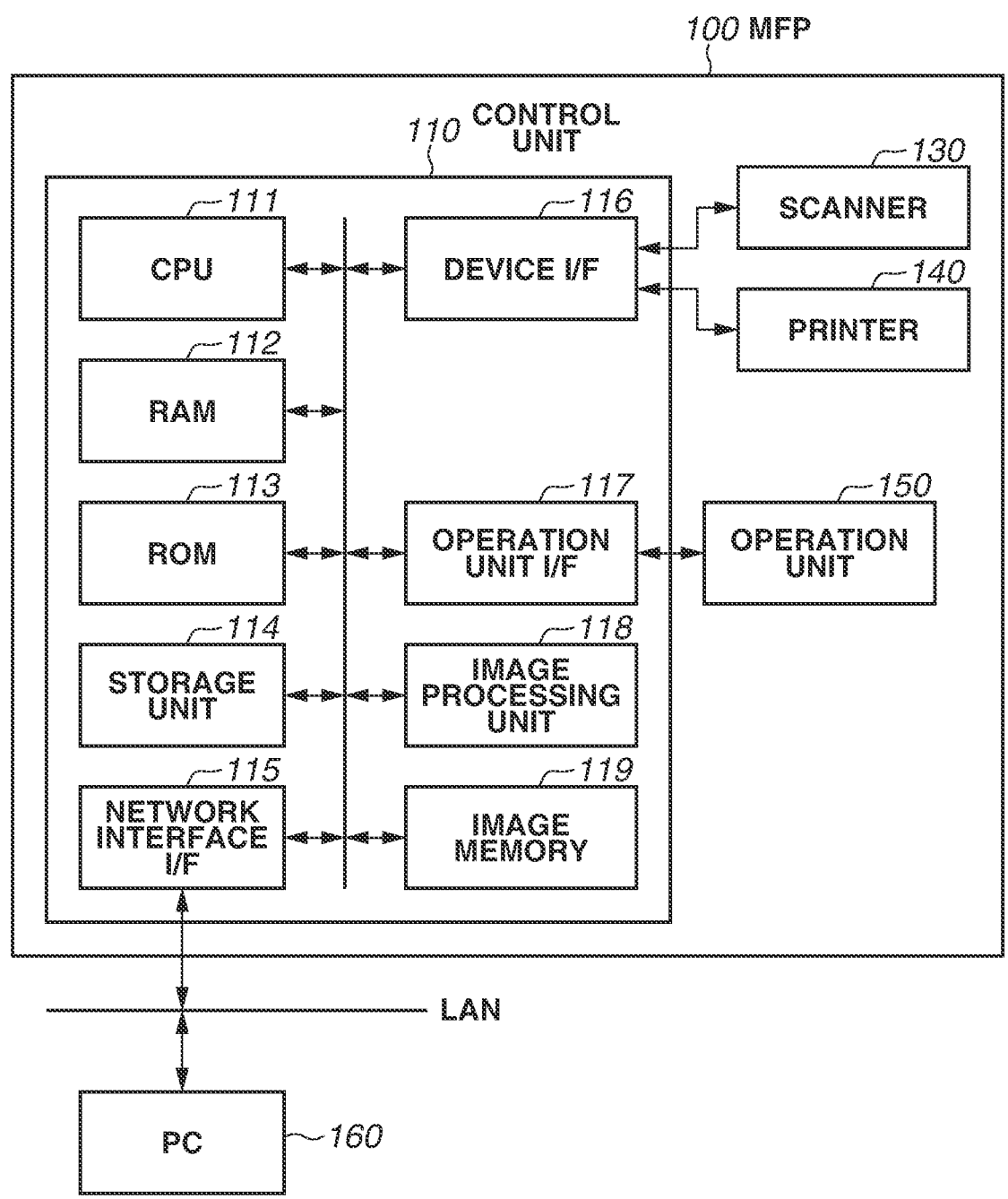
FIG. 1 is a block diagram of an image forming apparatus according to an exemplary embodiment.

FIG. 1 is a block diagram of a multifunctional peripheral (MFP) 100 used as an image forming apparatus according to an exemplary embodiment.

The MFP (image forming apparatus) 100 includes a control unit 110, a scanner 130, a printer 140, and an operation unit 150. The control unit 110 is connected to the scanner 130 serving as an image input device and the printer 140 serving as an image output device, and controls input and output of image information. Moreover, the control unit 110 is connected to a local area network (LAN) to receive a print job via the LAN. A central processing unit (CPU) 111 controls operations of the MFP 100. The CPU 111 operates based on a program stored in a random access memory (RAM) 112. A read only memory (ROM) 113 serving as a boot ROM stores a boot program for a system.

A storage unit 114 stores, for example, system software, image data, and a program for controlling an operation of the MFP 100. The program stored in the storage unit 114 is loaded to the RAM 112, and the CPU 111 controls an operation of the MFP 100 based on the loaded program. A network interface (I/F) 115 is connected to the LAN to communicate with an external device such as a personal computer (PC) 160 via the network and allows input and output of various information. The MFP 100 is connectable to the PC 160 via the LAN. A device I/F 116 connects the scanner 130 and the printer 140 to the control unit 110 to synchronously/asynchronously convert image data.

An operation unit I/F 117 is an interface connecting the operation unit 150 to the control unit 110, and outputs image data to be displayed on the operation unit 150 to the operation unit 150. Moreover, the operation unit I/F 117 transfers information that is input by a user from the operation unit 150 to the CPU 111. An image processing unit 118 performs image processing on print data received via the LAN and image data to be input to and output from the device I/F 116. Such image data to be processed by the image processing unit 118 is temporarily loaded to an image memory 119.

Figure 2:
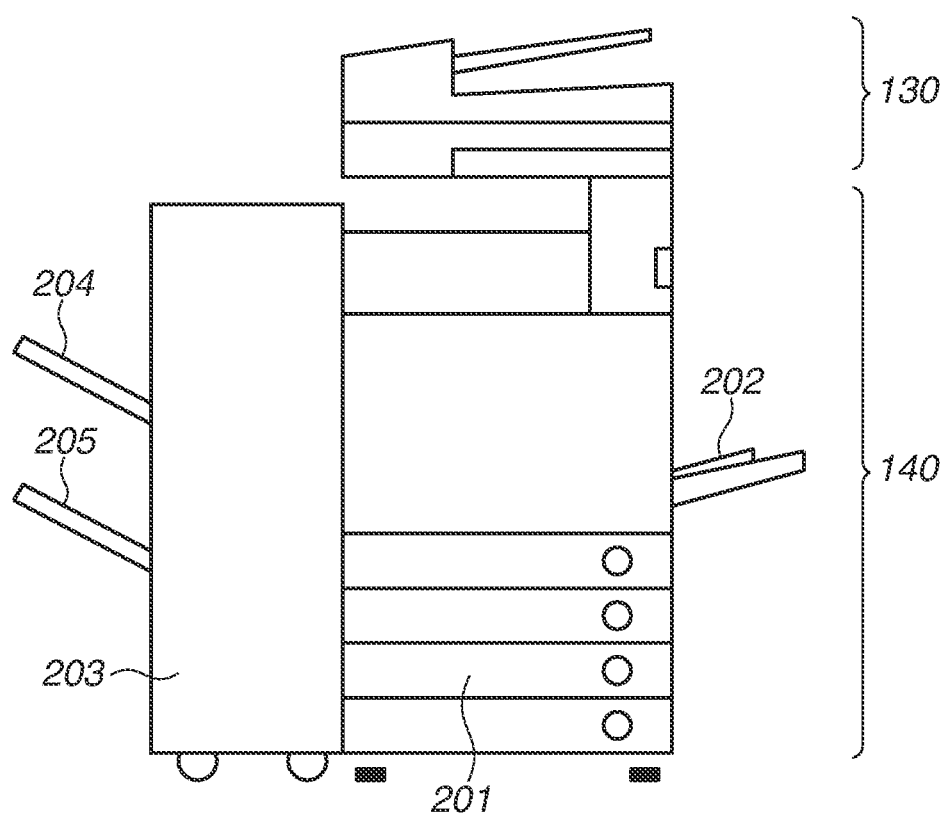
FIG. 2 is an external view of the image forming apparatus according to the exemplary embodiment.

FIG. 2 is an external view of the MFP 100. The MFP 100 includes the scanner 130 arranged on a top portion of the printer 140. The printer 140 includes a plurality of cassettes 201 each of which can hold several hundred sheets, and a manual feed tray 202 that allows sheets to be readily replaced. That is, the printer 140 includes two types of sheet holding units. A size and a type of sheets placed on each of the cassettes 201 are set by the user via an operation screen (not illustrated), and the set size and type are stored in the ROM 113 in association with each of the cassettes 201. A size and a type of sheets placed on each of the cassettes 201 and the manual feed tray 202 may also be automatically detected.

Moreover, a finisher 203 including a plurality of output destination trays 204 and 205 to which printed matters are output is attached to the MFP 100. However, such an external finisher may not be attached to the MFP 100. In such a case, a printed matter is output to a main body of the MFP 100.

Figure 3:
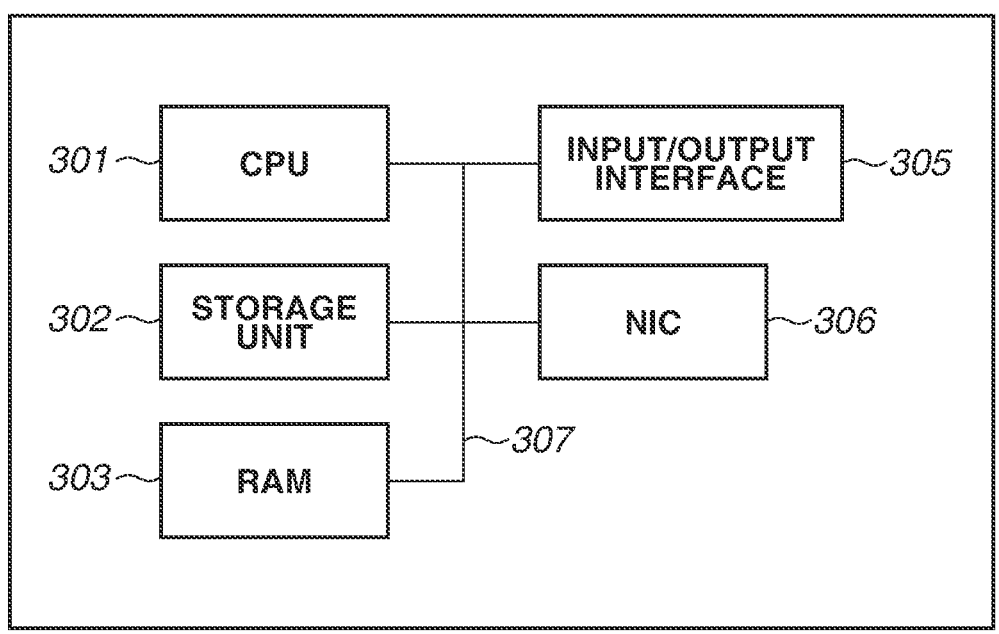
FIG. 3 is a system block diagram of a personal computer (PC) according to the exemplary embodiment.

FIG. 3 is a diagram illustrating a hardware configuration of the PC 160 (an information processing apparatus). A CPU 301 executes various programs to provide various functions. A storage unit 302 stores various programs and setting data. The CPU 301 loads a program stored in the storage unit 302 to a RAM 303 to execute the program. The RAM 303 is a unit also used as a temporary work storage area of the CPU 301. An input/output interface 305 as an interface unit not only transmits data to each device and a display (not illustrated) that is connected to the PC 160, but also receives data from a pointing device (not illustrated). A network interface card (NIC) 306 is a unit connecting the PC 160 to a network. Each of the above-described units can transmit and receive data via a bus 307.

Figure 4:
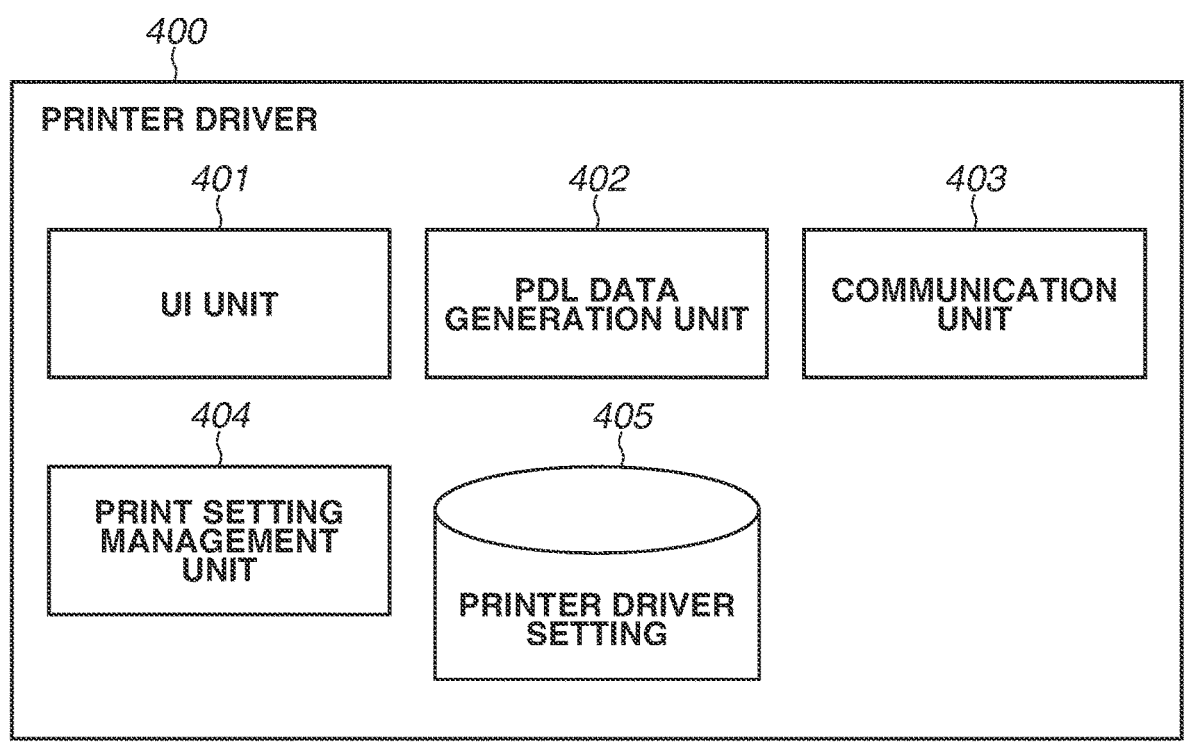
FIG. 4 is a software configuration diagram of the PC according to the exemplary embodiment.

FIG. 4 is a diagram illustrating a configuration of software that operates on the PC 160. A program of this software is stored in the storage unit 302. A printer driver 400 has a function of communicating with the MFP 100 in response to a request from an application to transmit page description language (PDL) data generated on the PC 160 to the MFP 100.

The printer driver 400 includes a user interface (UI) unit 401, a PDL data generation unit 402, a communication unit 403, a print setting management unit 404, and a printer driver setting 405. The UI unit 401 provides a user interface relating to a print setting of the printer driver 400. The PDL data generation unit 402 generates PDL data according to a designated print setting. The communication unit 403 performs network communication with the MFP 100 by using a network interface card (NIC) 305. NIC 305 may be referred as input/output interface 305. The print setting management unit 404 presents a print setting screen to the user via the UI unit 401 to manage setting information relating to execution of printing. The printer driver setting 405 is printer driver setting information to be stored in the storage unit 302, and is stored by the print setting management unit 404.

Figure 5A:
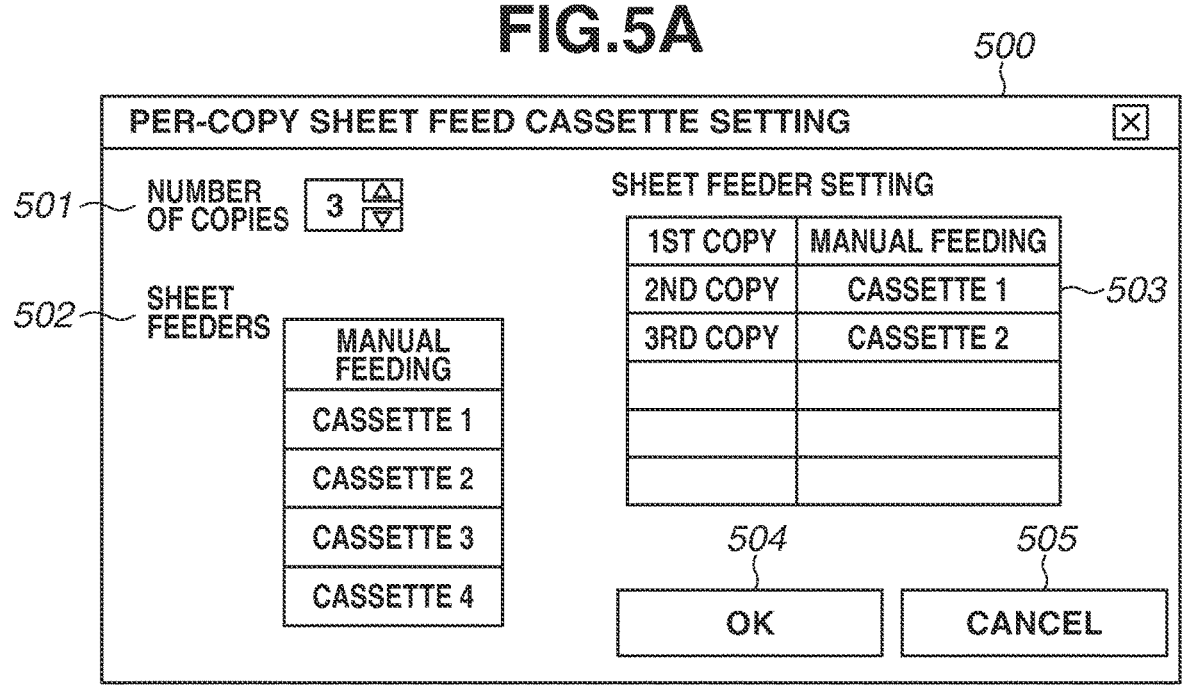
FIGS. 5A and 5B are examples of printer driver setting screens according to the exemplary embodiment.
Figure 5B:
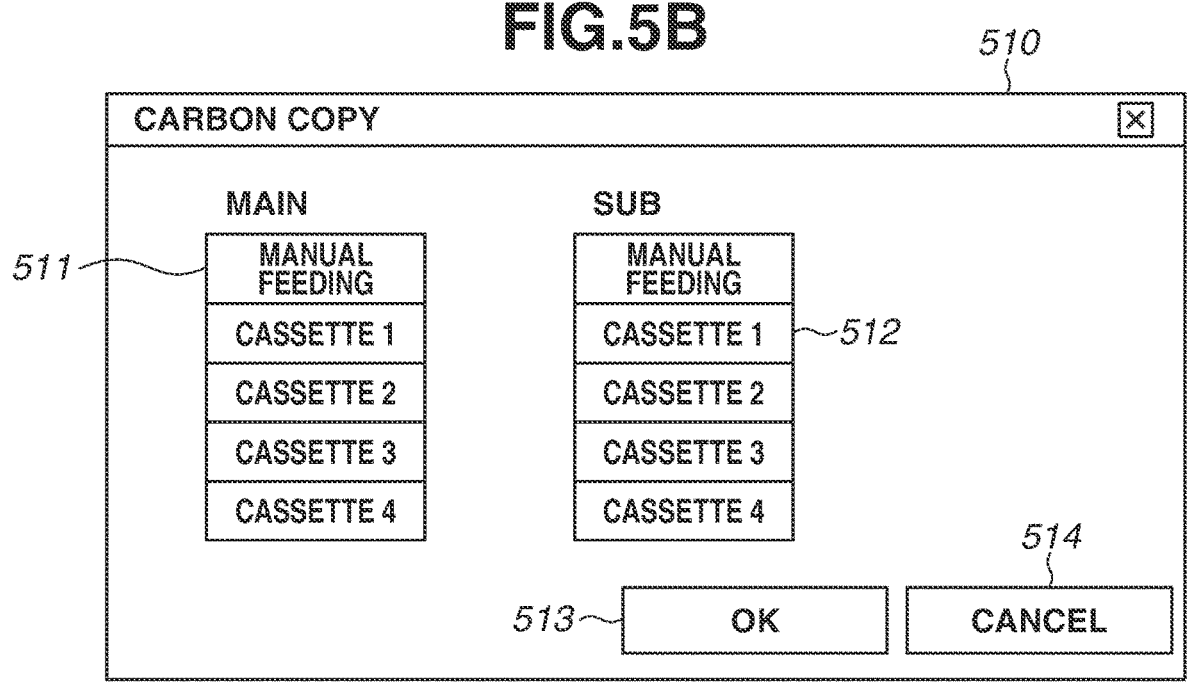

FIGS. 5A and 5B are diagrams illustrating examples of UI screens for the printer driver 400. With such UI screens, printing of a plurality of copies can be designated, and a sheet feeder for feeding sheets is changed on a copy basis. FIG. 5A illustrates an example of a UI screen used in a case where a sheet feeder (a sheet feed cassette) is selected on a copy basis. The UI screen illustrated in FIG. 5A includes a number-of-copies selection section 501, a sheet feeder selection section 502, a sheet feeder setting list 503, an OK button 504, and a cancel button 505. In the number-of-copies selection section 501, the number of copies is selected. FIG. 5A illustrates an example case in which the number of copies is set to 3. In the sheet feeder selection section 502, a sheet feeder that supplies sheets when the number of copies selected in the number-of-copies selection section 501 is printed is selected. The sheet feeder setting list 503 is an area that displays settings on a copy basis. The settings set using the number-of-copies selection section 501 and the sheet feeder selection section 502 are displayed in the sheet feeder setting list 503. If the OK button 504 is pressed in a state where the sheet feeder for each copy is set using the number-of-copies selection section 501 and the sheet feeder selection section 502, setting information is stored. If the cancel button 505 is pressed, the setting information is rejected.

If the number of sheet feeders set using a per-copy sheet feeder setting screen 500 is less than the number of printing copies set using a number-of-copies setting unit (not illustrated), a sheet feeder that is last set in the list is set as a designated sheet feeder for the remaining copies.

FIG. 5B illustrates an example of an UI screen used in a case where main printing and sub printing are distinguished and a sheet feeder is changed based on the distinction. "Main printing" may be original printed sheets and "Sub printing" may be a copy of the original printed sheets. The UI screen illustrated in FIG. 5B includes a main sheet feeder selection section 511, a sub sheet feeder selection section 512, and an OK button 513, and a cancel button 514. In the main sheet feeder selection section 511, a sheet feeder to be used at the time of main printing is selected. In the sub sheet feeder selection section 512, a sheet feeder to be used at the time of sub printing is selected. Herein, a sheet feeder that is selected in the main sheet feeder selection section 511 cannot be selected in the sub sheet feeder selection section 512. Moreover, in the sub sheet feeder selection section 512, multiple selections can be made. If the OK button 513 is pressed in a state where the sheet feeders are set using the main sheet feeder selection section 511 and the sub sheet feeder selection section 512, setting information is stored. If the cancel button 514 is pressed, the setting information is rejected.

Next, execution of a PDL job will be described.

Figure 6:
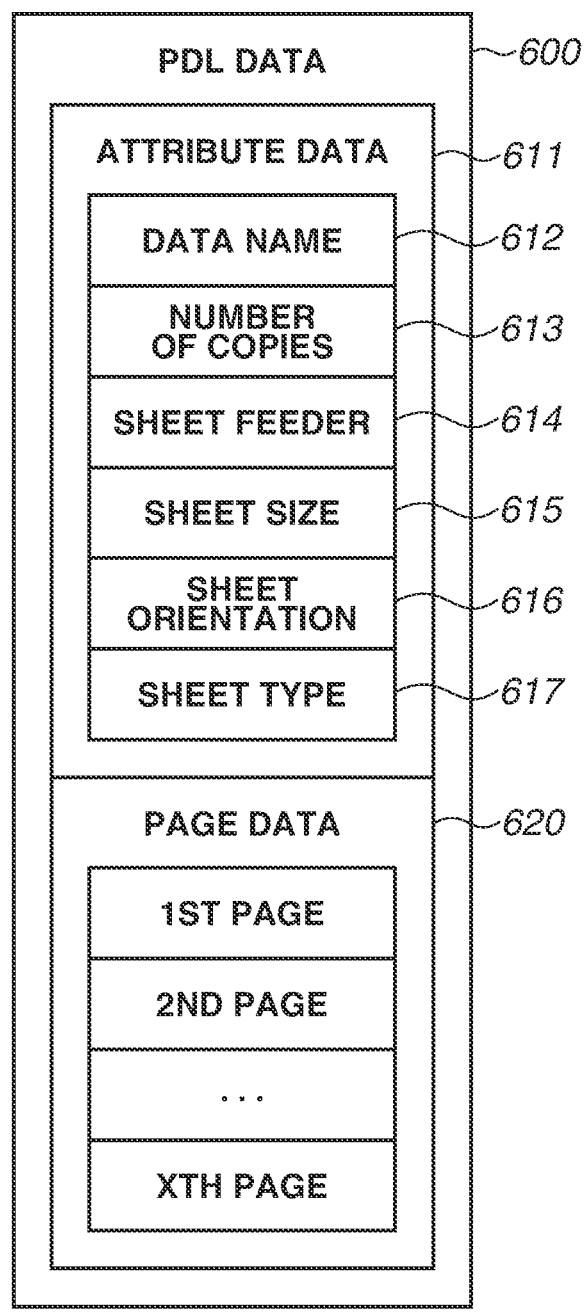
FIG. 6 is a conceptual diagram of page description language (PDL) data according to the exemplary embodiment.

FIG. 6 is a conceptual diagram of PDL data 600. Attribute data 611 includes information of each of a data name 612, a number of copies 613, a sheet feeder 614, a sheet size 615, a sheet orientation 616, and a sheet type 617. The data name 612 represents a name identifying the PDL data 600, and is information that is provided based on, for example, a file name of application data serving as a source of the PDL data 600. The number of copies 613 is information indicating the number of printing copies. The sheet feeder 614 is information indicating a feeder of sheets to be used in printing. If a user designates a specific sheet feed cassette as a sheet feeder, information of the sheet feeder 614 indicates either the cassette 201 or the manual feed tray 202. Designation of a sheet feeder with respect to a PDL job is optional. If the user does not designate a sheet feeder, information indicating "automatic selection" is stored as information of the sheet feeder 614. Moreover, if a sheet feeder to be used is changed on a copy basis, a sheet feeder for each copy is stored as information of the sheet feeder 614.

The sheet size 615 is information indicating a sheet size designated by the user. A sheet size must be designated with respect to a PDL job, and the information of the sheet size 615 is always included in the PDL data 600. The sheet orientation 616 is information indicating a sheet orientation designated by the user. If the user does not designate a sheet orientation, information of the sheet orientation 616 is omitted. The sheet type 617 is information indicating a sheet type designated by the user. A sheet type is optionally set with respect to a PDL job. If the user does not designate a sheet type, information of the sheet type 617 is omitted. Page data 620 includes image data of each page.

Figure 7:
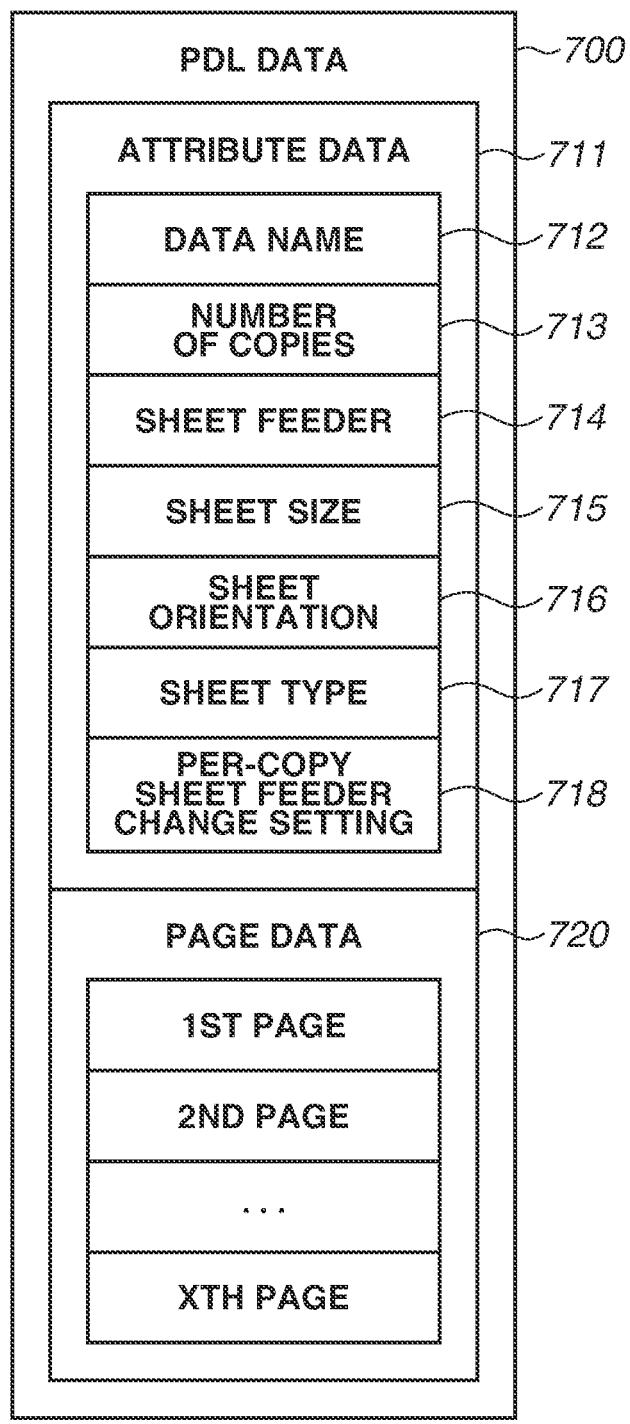
FIG. 7 is a conceptual diagram of PDL data according to the exemplary embodiment.

FIG. 7 is a conceptual diagram of other PDL data 700 in a case where a sheet feeder for supplying sheets is changed on a copy basis. Attribute data 711 includes information of each of a data name 712, a number of copies 713, a sheet feeder 714, a sheet size 715, a sheet orientation 716, and a sheet type 717 that are respectively similar to the data name 612, the number of copies 613, the sheet feeder 614, the sheet size 615, the sheet orientation 616, and the sheet type 617 described above with reference to FIG. 6. A per-copy sheet feeder change setting 718 is information that is used for determination of whether a change of a sheet feeder on a copy basis has been instructed by a driver. A determination of whether to perform processing for changing a sheet feeder on a copy basis can be made based on such information of the per-copy sheet feeder change setting 718.

Figure 8:
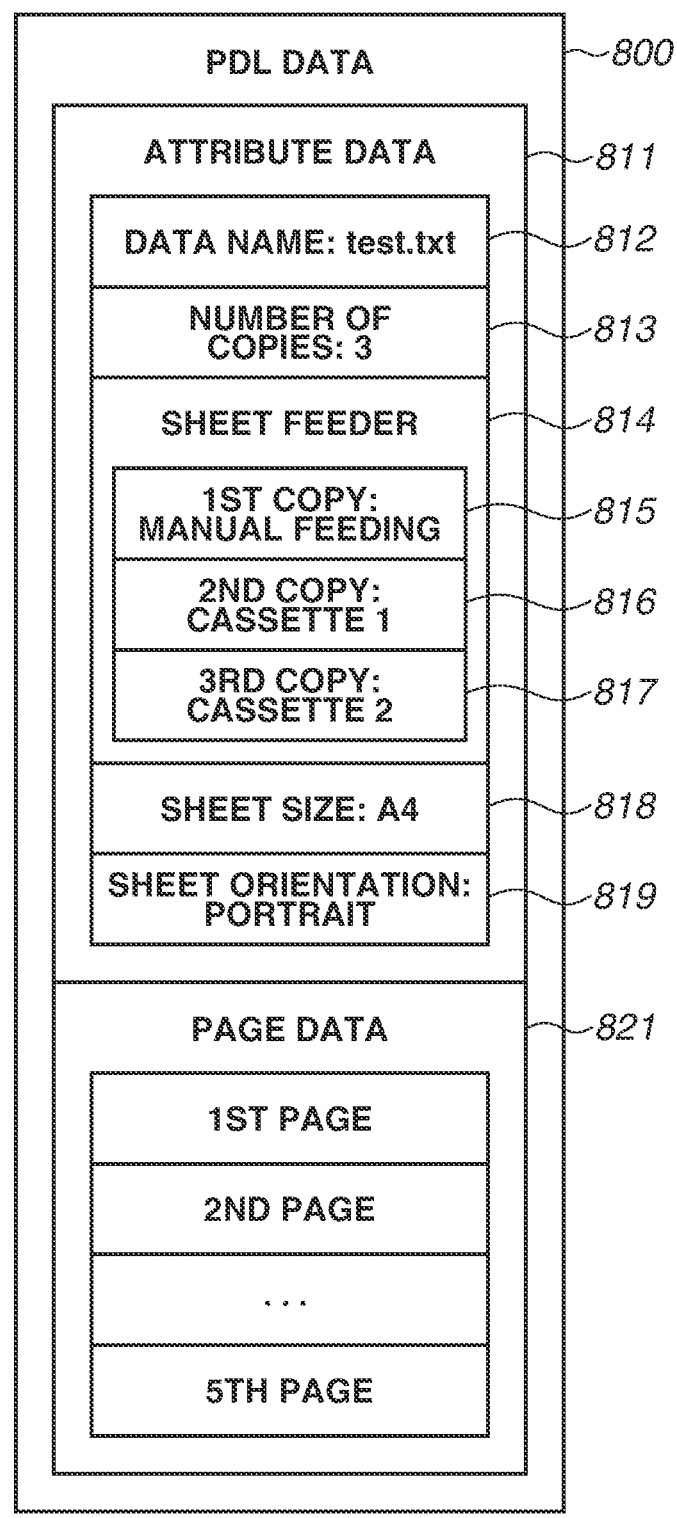
FIG. 8 is a diagram of an example of the PDL data according to the exemplary embodiment.

FIG. 8 illustrates a concrete example of the PDL data 600. In the example illustrated in FIG. 8, "test.txt" is set to a data name 812 of attribute data 811, and "3" is set to a number of copies 813. Moreover, in setting information of a sheet feeder 814, "manual feeding", "cassette 1", and "cassette 2" are respectively set to a first copy, a second copy, and a third copy. That is, different sheet feed cassettes can be set for Nth printing (N is an integer of 1 or greater) and (N+1)th printing. The sheet feed cassettes to be used for the Nth printing and the (N+1)th printing differ. However, the sheet cassettes to be used for the (N+1)th printing and (N+2)th printing can be the same. Since there are multiple sheet feeders, processing for changing a sheet feeder on a copy basis works. In the example illustrated in FIG. 8, "A4" is set to a sheet size 818, and "portrait" is set to a sheet orientation 819. In this example, a sheet type is not set. Moreover, data of five pages is included as page data 821. Examples of types of sheets stored in the sheet feed cassettes (the cassette 1, the cassette 2) include plain paper, recycled paper, thick paper, and glossy paper.

To obtain a suitable printed matter by printing, image processing for restricting a toner amount within a range in which normal printing can be performed according to a sheet, and image processing for converting multivalued data into binary data are desirable. A plurality of execution timings of such processing is possible.

As mentioned above, conventionally, in a case where a plurality of copies is to be output, the PDL data received from the PC 160 undergoes raster image processing (RIP) to generate multivalued image data. The generated multivalued image data is temporarily stored in the storage unit 114. This enables not only the plurality of copies to be output with single RIP, but also reprinting to be executed using a stored image at the time of error in printing such as a sheet jam.

In the first exemplary embodiment, the printer driver 400 transmits PDL data to the MFP 100, and the MFP 100 performs RIP and image processing according to a sheet type for the number of sheet feeders written in the received PDL data. Then, the image having been subjected to the image processing is temporarily stored in the storage unit 114, and an image read from the storage unit 114 is printed. In the first exemplary embodiment, the aforementioned configuration will be described.

Figure 9:
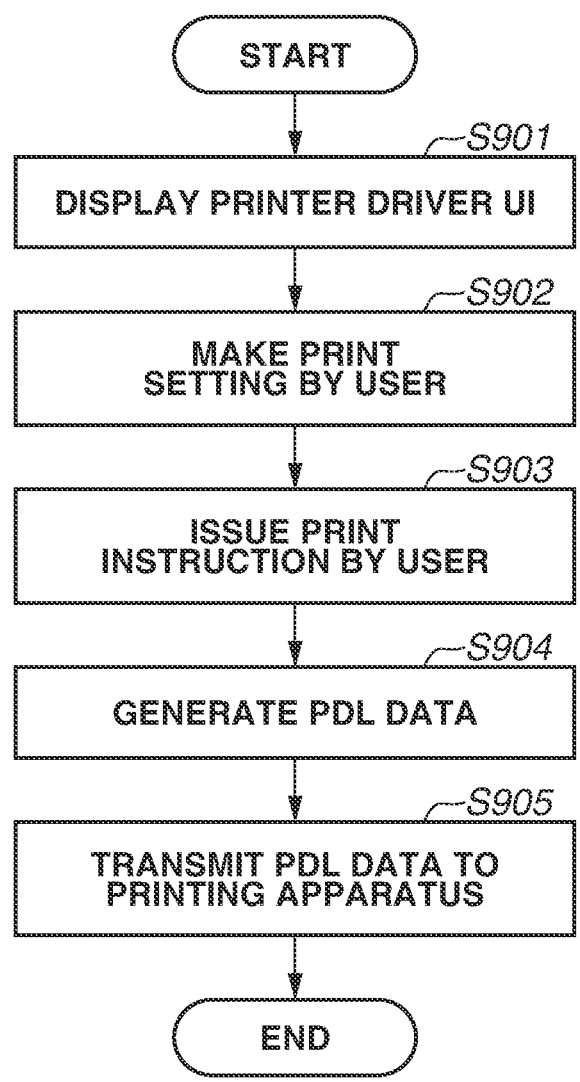
FIG. 9 is a flowchart of operations performed by a printer driver according to a first exemplary embodiment.

FIG. 9 is a flowchart of operations performed by the printer driver 400 according to the first exemplary embodiment. A control program stored in the storage unit 302 is loaded to the RAM 303, and the CPU 301 executes the loaded control program, so that the operations in the flowchart illustrated in FIG. 9 are executed.

In step S901, the printer driver 400 displays a printer driver UI screen on a screen of the PC 160. In step S902, a user operates the printer driver screen to make a print setting. Herein, the user operates a UI as illustrated in FIG. 5 to make a sheet feed cassette setting on a copy basis. In step S903, the user operates the printer driver screen to issue a print instruction.

In step S904, the printer driver 400 generates PDL data. Herein, the printer driver 400 generates PDL data as illustrated in FIG. 6 or 7 according to the per-copy sheet feed cassette setting made in step S902. In step S905, the printer driver 400 transmits the PDL data (print data) to the image forming apparatus.

Figure 10:
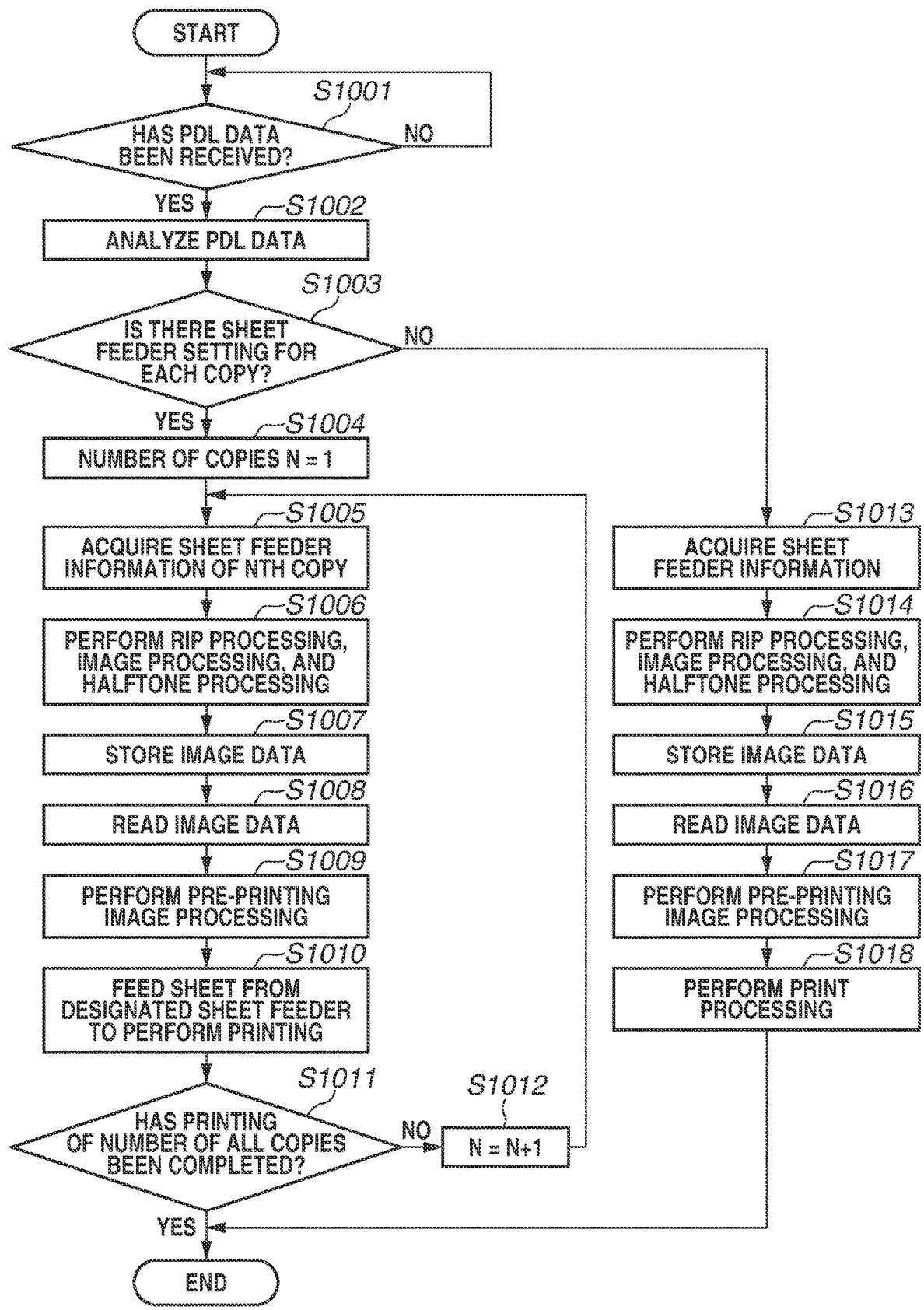
FIG. 10 is a flowchart of operations performed by the image forming apparatus according to the first exemplary embodiment.

FIG. 10 is a flowchart of operations relating to execution of a PDL job in which a sheet feeder is changed on a copy basis according to the first exemplary embodiment. A control program stored in the storage unit 113 is loaded to the RAM 112, and the CPU 111 executes the loaded control program, so that the operations in the flowchart illustrated in FIG. 10 are executed.

In step S1001, the MFP 100 determines whether the PDL data 600 (print data) has been received. If the PDL data 600 has been received (YES in step S1001), the processing proceeds to step S1002. In step S1002, the MFP 100 analyzes the received PDL data 600, thereby acquiring at least information of each of the sheet feeder 614, the sheet size 615, the sheet orientation 616, and the sheet type 617 from the attribute data 611.

In step S1003, the MFP 100 determines whether there is a sheet feeder setting for each copy. If there is a sheet feeder setting for each copy (YES in step S1003), the processing proceeds to step S1004. If there is no sheet feeder setting for each copy (NO in step S1003), the processing proceeds to step S1013. The determination of whether there is a sheet feeder setting for each copy can be made based on whether a plurality of sheet feeders is stored in the sheet feeder 614. Alternatively, an attribute that sets ON/OFF of a sheet feeder setting may be added to the PDL data 600, so that the MFP 100 can determine whether there is a sheet feeder setting for each copy based on the ON/OFF setting. In step S1004, the MFP 100 initializes the number of copies N indicated by a counter with 1.

In step S1005, the MFP 100 acquires sheet feeder information of an Nth copy. In step S1006, the MFP 100 performs RIP processing on the PDL data to generate multivalued image data. The MFP 100 performs image processing for controlling a toner amount with respect to the generated multivalued image data based on information (e.g., grammage, surface property, thickness, and application) of sheets arranged in the sheet feeder for the Nth copy, then performs halftone processing on the multivalued image data having been subjected to the image processing, thereby converting the multivalued image data into binary image data.

In step S1007, the MFP 100 stores the binary image data having been subjected to the halftone processing in step S1006 in the storage unit 114. In step S1008, the MFP 100 reads the binary image data stored in the storage unit 114. A configuration in which a series of operations of image processing is executed using the image memory 119 instead of using the storage unit 114 may be employed. In such a case, the processing can proceed from step S1006 to step S1009. In step S1009, the MFP 100 performs image processing that is necessary for formation of an image to be printed. More specifically, the MFP 100 performs image processing such as image rotation processing according to a sheet orientation. In step S1010, the MFP 100 feeds a sheet from the sheet feeder for the Nth copy based on the information of the sheet feeder 614 to perform printing.

In step S1011, the MFP 100 compares the number of copies 613 set in the PDL data 600 with the number of copies N indicated by the counter to determine whether the printing of the number of all copies has been completed. If printing of the number of all copies has been completed (YES in step S1011), the processing ends. If printing of the number of all copies has not been completed yet (NO in step S1011), the processing proceeds to step S1012. In step S1012, the number of copies N indicated by the counter is incremented by 1, and the processing proceeds to step S1005.

If there is no sheet feeder setting for each copy (NO in step S1003), the processing proceeds to step S1013. In step S1013, the MFP 100 acquires information of the sheet feeder 614. The processing in steps S1014, S1015, S1016, and S1017 is similar to that in the respective steps S1006, S1007, S1008, and S1009, and thus description thereof is omitted. In step S1018, the MFP 100 feeds a sheet from the sheet feeder set in the sheet feeder 61 to print an image.

Figure 11:
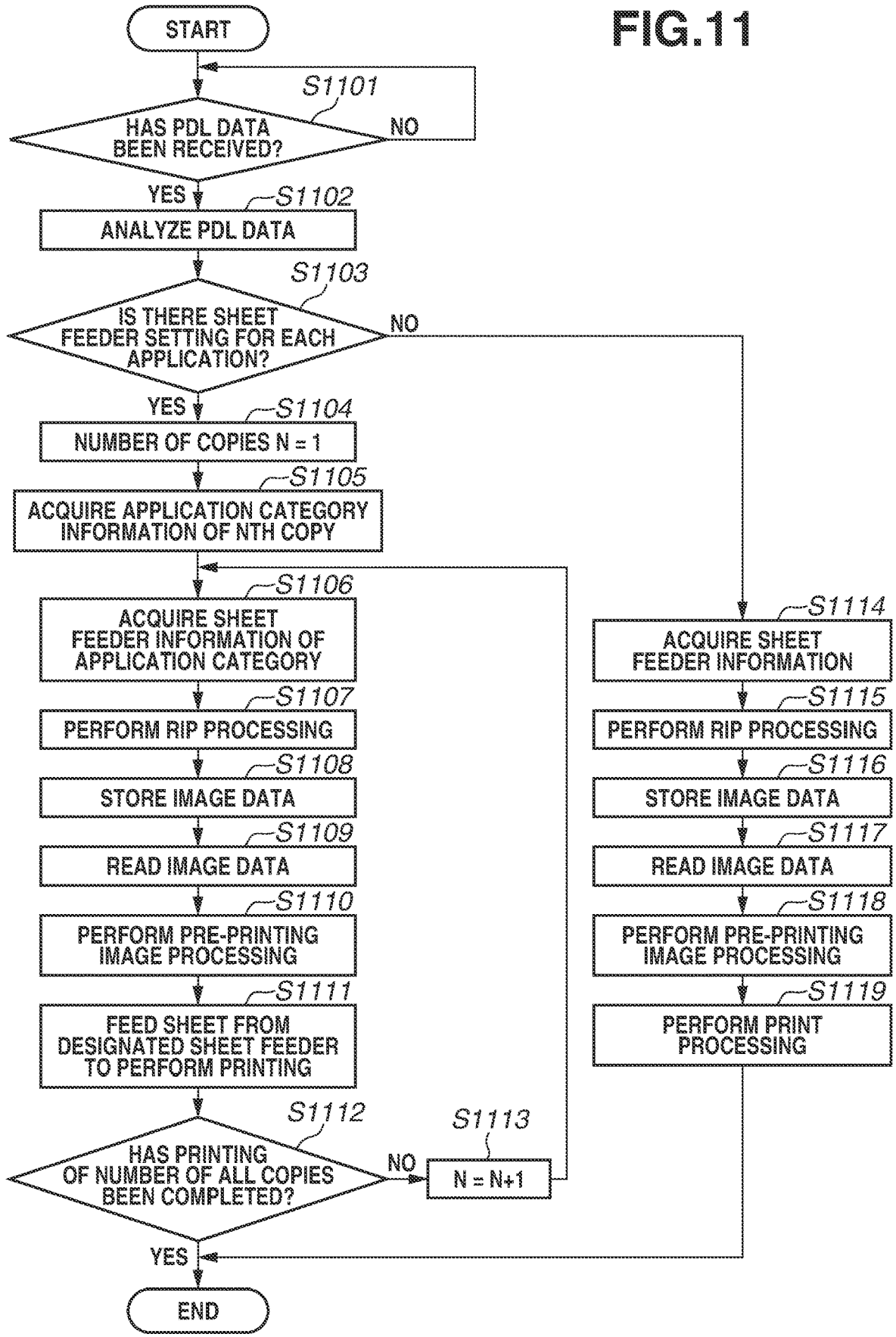
FIG. 11 is a flowchart of operations performed by the image forming apparatus according to the first exemplary embodiment.

FIG. 11 is a flowchart of operations relating to execution of a PDL job in which a sheet feeder is changed on an application basis by distinguishing main printing and sub printing according to the first exemplary embodiment. A control program stored in the ROM 113 is loaded to the RAM 112, and the CPU 111 executes the loaded control program, so that the operations in the flowchart illustrated in FIG. 11 are executed.

In step S1101, the MFP 100 determines whether the PDL data 600 has been received. If the PDL data 600 has been received (YES in step S1101), the processing proceeds to step S1102. In step S1102, the MFP 100 analyzes the received PDL data 600, thereby acquiring at least information of each of the sheet feeder 614, the sheet size 615, the sheet orientation 616, and the sheet type 617 from the attribute data 611.

In step S1103, the MFP 100 determines whether there is a sheet feeder setting for each application. If the MFP 100 determines that there is a sheet feeder setting for each application (YES in step S1103), the processing proceeds to step S1104. If the MFP 100 determines that there is no sheet feeder setting by application (NO in step S1103), the processing proceeds to step S1114. In a case where a sheet feeder for feeding sheets is changed on an application category basis, an application category attribute is added as information of the sheet feeder 614 to each sheet feeder. Thus, the MFP 100 can determine whether there is a sheet feeder setting for each application based on the presence or absence of such an attribute. Alternatively, an attribute that sets ON/OFF of a sheet feeder for each application category may be added to the PDL data 600, so that the MFP 100 can determine whether there is a sheet feeder setting for each application category based on the ON/OFF setting.

In step S1104, the MFP 100 initializes the number of copies N indicated by the counter with 1. In step S1105, the MFP 100 acquires application category information of Nth copy. In step S1106, the MFP 100 acquires sheet feeder information of the application category.

In step S1107, the MFP 100 executes RIP processing on the PDL data to generate multivalued image data. The MFP 100 performs image processing for controlling a toner amount with respect to the generated multivalued image data based on sheet type information of sheets arranged in the sheet feeder for the Nth copy, then performs halftone processing on the multivalued image data having been subjected to the image processing, thereby converting the multivalued image data into binary image data.

In step S1108, the MFP 100 stores the binary image data having been subjected to the halftone processing in step S1107 in the storage unit 114. In step S1109, the MFP 100 reads the binary image data stored in the storage unit 114. A configuration in which a series of operations of image processing is executed using the image memory 119 instead of using the storage unit 114 may be employed. In such a case, the processing can proceed from step S1107 to step S1110. In step S1110, the MFP 100 performs image processing that is necessary for formation of an image to be printed. More specifically, the MFP 100 performs image processing such as image rotation processing according to a sheet orientation. In step S1111, the MFP 100 feeds a sheet from the sheet feeder for the Nth copy based on the sheet feeder information, and performs printing.

In step S1112, the MFP 100 compares the number of copies 613 set in the PDL data 600 with the number of copies N indicated by the counter to determine whether the printing of the number of all copies has been completed. If printing of the number of all copies has been completed (YES in step S1112), the processing ends. If printing of the number of all copies has not been completed yet (NO in step S1112), the processing proceeds to step S1113. In step S1113, the number of copies N indicated by the counter is incremented by 1, and the processing proceeds to step S1106.

If the MFP 100 determines that there is no sheet feeder setting for each application (NO in step S1103), the processing proceeds to step S1114 in which the MFP 100 acquires the sheet feeder 614. The processing in steps S1115, S1116, S1117, and S1118 is similar to that in the respective steps S1107, S1108, and S1109, and S1110, and thus description thereof is omitted. In step S1119, the MFP 100 feeds a sheet from the sheet feeder set in the sheet feeder 614 to print an image.

Figure 12:
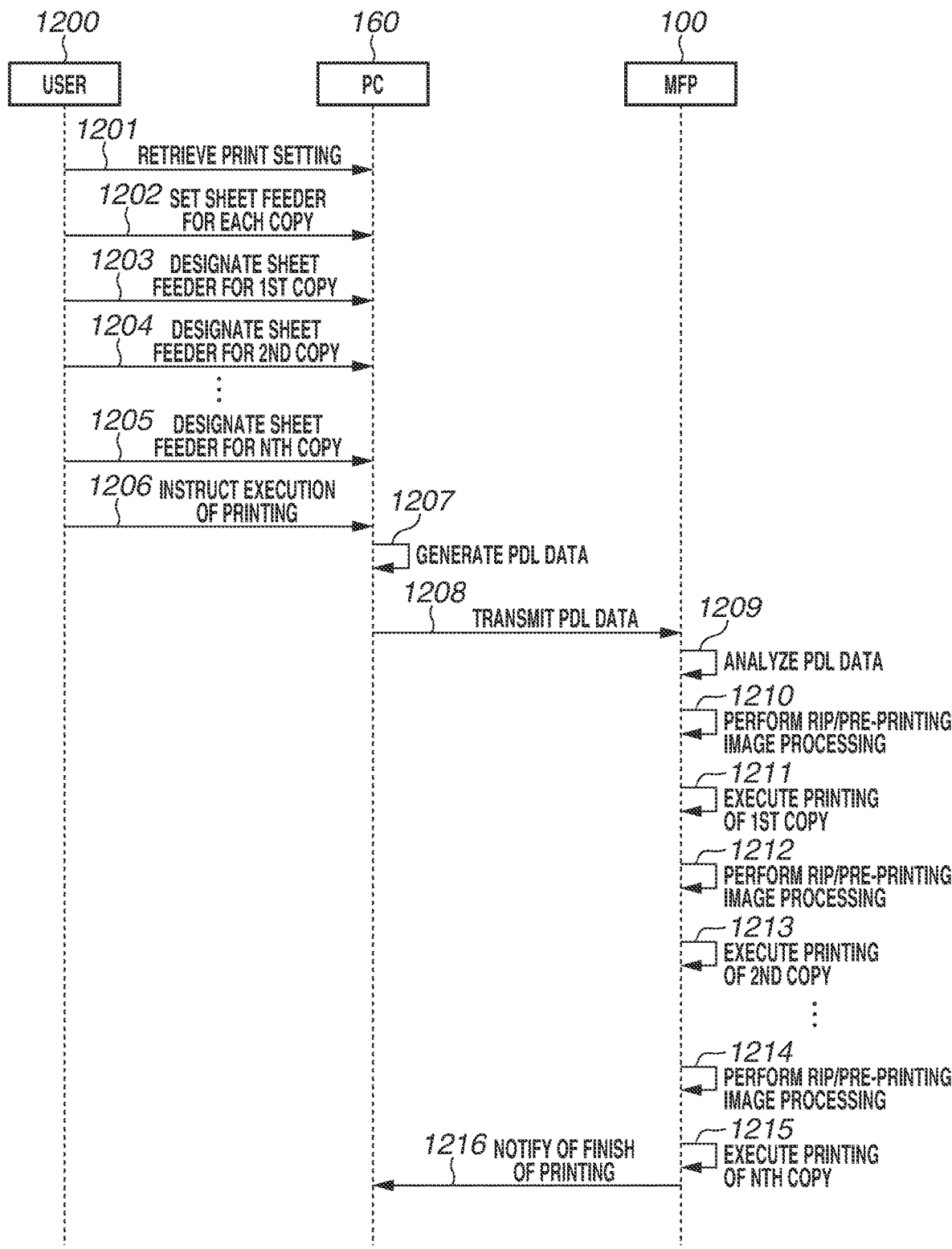
FIG. 12 is a flowchart of operations performed by an entire system according to the first exemplary embodiment.

FIG. 12 is a flowchart of operations from an operation of the printer driver 400 on the PC 160 by a user to completion of a printing operation by the MFP 100.

In step S1201, a user 1200 activates the printer driver 400 on the PC 160 to start to make a print setting. In steps S1202, 1203, 1204, and 1205, the user 1200 selects a per-copy sheet feeder setting by the printer driver 400, and sets a sheet feeder on a copy basis. In step S1206, the user 1200 issues an instruction for execution of printing by the MFP 100 to the printer driver 400.

In step S1207, the printer driver 400 generates PDL data based on the set print setting. In step S1208, the printer driver 400 transmits the PDL data to the MFP 100. In step S1209, upon receipt of the PDL data, the MFP 100 analyzes the received PDL data. In step S1210, the MFP 100 executes RIP processing, image processing, and halftone processing, storing/reading of an image, and pre-printing image processing for the first copy based on the PDL data.

In step S1211, the MFP 100 executes printing of the first copy based on the PDL data. Herein, sheets are supplied from the sheet feeder for the first copy set in the PDL data. In steps S1212, S1213, S1214, and S1215, the MFP 100 repeatedly executes RIP processing, storing/reading of an image, pre-printing image processing, and printing for the number of copies set in the PDL data. In step S1216, upon finish of printing, the MFP 100 notifies the PC 160 of the finish of printing.

Accordingly, if a setting of a sheet feeder that feeds sheets on a copy basis is valid, RIP processing, image processing according to a sheet type, and halftone processing are repeatedly executed with respect to the received PDL data for the number of copies to be output. Thus, the image having been subjected to the image processing according to a sheet to be output can be printed.

In another exemplary embodiment, a printer driver 400 of a PC 160 generates PDL data for the number of copies to be output, and transmits the generated PDL data to an MFP 100. Accordingly, the MFP 100, based on the received PDL data, executes RIP processing and image processing according to a sheet to be output to perform printing without consideration of the presence or absence of a sheet feeder change setting.

Since configurations of hardware and software of the PC 160 and the MFP 100 according to the another exemplary embodiment are similar to those of the first exemplary embodiment described with reference to FIGS. 1, 2, 3, 4, 5, 6, 7, and 8, descriptions thereof are omitted. Hereinafter, differences from the first exemplary embodiment will be described.

Figure 13:
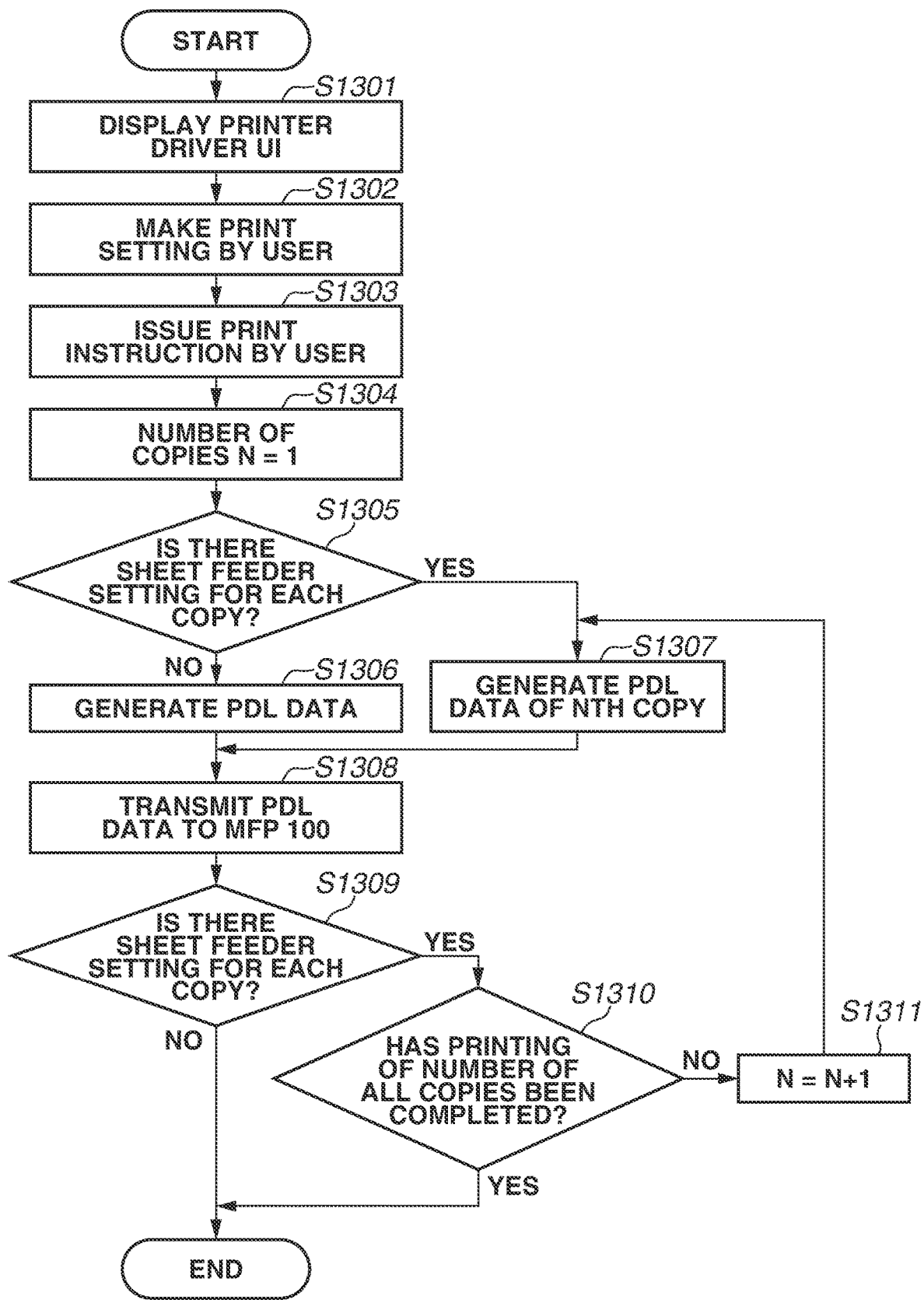
FIG. 13 is a flowchart of operations performed by a printer driver according to another exemplary embodiment.

FIG. 13 is a flowchart of operations performed by the printer driver 400 according to the another exemplary embodiment. A control program stored in a storage unit 302 is loaded to a RAM 303, and a CPU 301 executes the loaded program, so that the operations in the flowchart illustrated in FIG. 13 are performed.

In step S1301, the printer driver 400 displays a printer driver UI screen on a screen of the PC 160. In step S1302, a user operates the printer driver UI screen to make a print setting. Herein, the user can make a sheet feeder (sheet feed cassette) setting for each copy by operating a UI such as that illustrated in FIG. 5. In step S1303, the user operates the printer driver UI screen to issue an output instruction.

In step S1304, the number of copies N indicated by a counter is initialized with 1. Subsequently, if there is a sheet feeder setting for each copy in the setting made in step S1302 (YES in step S1305), the processing proceeds to step S1307. If there is no sheet feeder setting for each copy in the setting made in step S1302 (NO in step S1305), the processing proceeds to step S1306. In step S1306, the printer driver 400 generates PDL data as illustrated in FIG. 6 or 7.

In step S1307, the printer driver 400 generates PDL data for Nth copy as illustrated in FIG. 6 or 7. This PDL data includes the Nth-copy sheet feeder information set by the user in step S1302. Information other than the Nth-copy sheet feeder information is common to each copy. In step S1308, the PC 160 transmits the PDL data to the MFP 100. If there is no sheet feeder setting for each copy in the setting made in step S1302 (NO in step S1309), the processing ends. If there is a sheet feeder setting for each copy in the setting made in step S1302 (YES in step S1309), the processing proceeds to step S1310.

In step S1310, the number of sheet feeders set by the user in step S1302 is compared with the number of output copies. If the number of sheet feeders set by the user in step S1302 matches the number of output copies, transmission of the PDL data for the number of all copies has been completed (YES in step S1310), and the processing ends. If transmission of the PDL data for the number of all copies has not been completed yet (NO in step S1310), the processing proceeds to step S1307. The process may proceed to S1311 before proceeding S1307. That is the process may proceed to S1307 via S1311.

Figure 14:
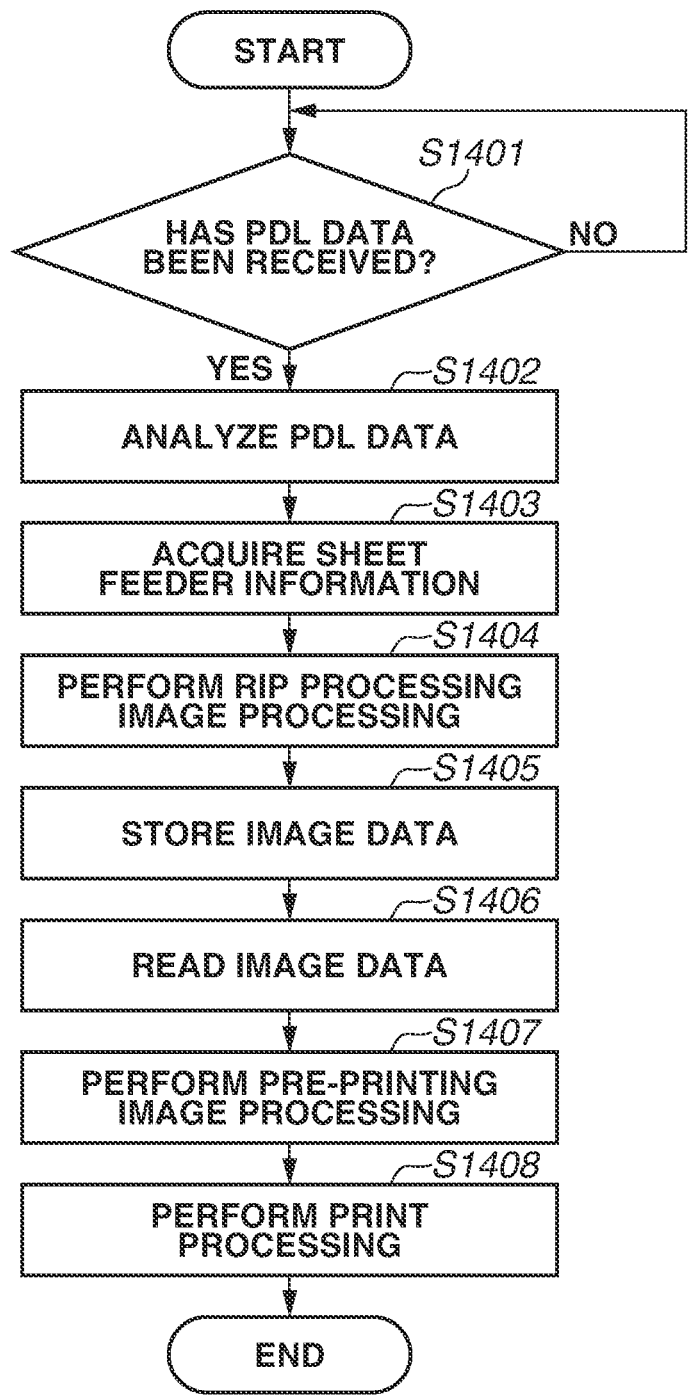
FIG. 14 is a flowchart of operations performed by an image forming apparatus according to the another exemplary embodiment.

FIG. 14 is a flowchart relating to execution of a PDL job in the MFP 100. A control program stored in a ROM 113 is loaded to a RAM 112, and a CPU 111 executes the loaded program, so that the operations in the flowchart illustrated in FIG. 14 are performed.

In step S1401, the MFP 100 determines whether PDL data 600 has been received. If the PDL data 600 has been received (YES in step S1401), the processing proceeds to step S1402. In step S1402, the MFP 100 analyzes the received PDL data 600, thereby acquiring at least information of each of a sheet feeder 614, a sheet size 615, a sheet orientation 616, and a sheet type 617 from attribute data 611. In step S1403, the MFP 100 acquires sheet feeder information.

In step S1404, the MFP 100 performs RIP processing on the received PDL data to generate image data. At this time, the MFP 100, based on sheet type information set in the sheet feeder for Nth copy, performs image processing for controlling a toner amount and processing for converting multivalued data into binary data.

In step S1405, the MFP 100 stores the image data generated in step S1404 in a storage unit 114. In step S1406, the MFP 100 reads the image data stored in the storage unit 114 in step S1405. A configuration in which a series of operations of image processing is executed using the image memory 119 instead of using the storage unit 114 may be employed. In such a case, the processing can proceed from step S1404 to step S1407 without the operations in step S1405 and S1406.

In step S1407, the MFP 100 performs image processing that is necessary for formation of an image to be printed. For example, the MFP 100 performs image rotation processing according to a sheet orientation. In step S1408, the MFP 100 feeds a sheet from the sheet feeder set in the sheet feeder 614 to print an image.

Figure 15:
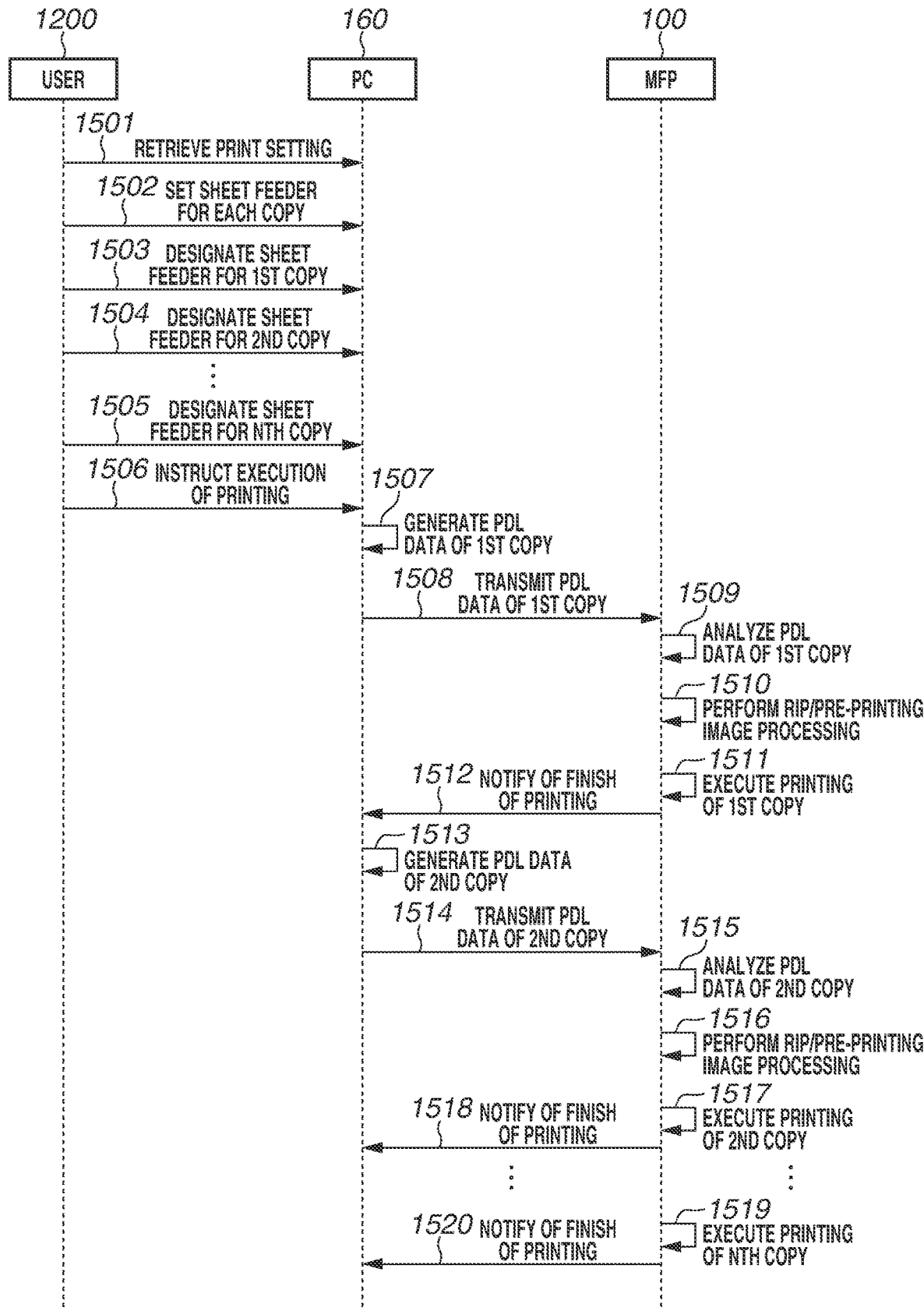
FIG. 15 is a flowchart of operations performed by an entire system according to the another exemplary embodiment.

FIG. 15 is a flowchart of operations from an operation of the printer driver 400 on the PC 160 by a user to completion of a printing operation by the MFP 100.

In step S1501, a user 1200 activates the printer driver 400 on the PC 160 to start to make a print setting. In steps S1502, S1503, S1504, and S1505, the user 1200 selects a per-copy sheet feeder setting by the printer driver 400, and sets a sheet feeder on a copy basis. In step S1506, the user 1200 issues an instruction for execution of printing by the MFP 100 to the printer driver 400.

In step S1507, the printer driver 400 generates PDL data of a first copy based on the set print setting. In step S1508, the printer driver 400 transmits the PDL data of the first copy to the MFP 100. In step S1509, upon receipt of the PDL data, the MFP 100 analyzes the received PDL data. In step S1510, the MFP 100 executes RIP processing, storing/reading of an image, and pre-printing image processing for the first copy based on the PDL data. In step S1511, the MFP 100 executes printing of the first copy. Herein, sheets are supplied from the sheet feeder for the first copy set in the PDL data. In step S1512, upon finish of the printing of the first copy, the MFP 100 notifies the PC 160 of the finish of printing.

Subsequently, in step S1513, the printer driver 400 generates PDL data for a second copy. In step S1514, the printer driver 400 transmits the PDL data generated in step S1513 to the MFP 100. In steps S1515, S1516, S1517, S1518, S1519, and S1520, the MFP 100 repeatedly executes analysis of the received PDL data, RIP processing, storing/reading of an image, image processing, and printing for the number of copies N set in the printer driver 400, that is, N times.

The MFP 100 notifies of the PC 160 of finish of printing, and then the PC 160 generates next PDL data for the sake of simplicity of the drawings. However, after transmitting PDL data, the PC 160 can immediately generate PDL data of a next copy. After that, the PC 160 can transmit the PDL data.

Accordingly, in the another exemplary embodiment, if a setting of a sheet feeder that feeds sheets on a copy basis is valid, a printer driver transmits PDL data for the number of copies to be output to an MFP. The MFP repeatedly executes RIP processing and image processing according to a sheet type for each received PDL data, so that an image processed according to a sheet to be output can be printed.

In still another exemplary embodiment, a printer driver 400 of a PC 160 transmits PDL data to an MFP 100. The MFP 100 performs RIP processing on the PDL data received from the PC 160, and stores multivalued image data having been subjected to the RIP processing in a storage unit 114. Then, the MFP 100 reads an image from the storage unit 114 and performs image processing according to a sheet to be output to perform printing for the number of pieces of sheet feeder information written in the PDL data.

In the still another exemplary embodiment, since configurations of hardware and software of the PC 160 and the MFP 100 and a portion of a flowchart are similar to those of the first exemplary embodiment described with reference to FIGS. 1, 2, 3, 4, 5, 6, 7, 8 and 9, descriptions thereof are omitted. Hereinafter, differences from the first exemplary embodiment will be described.

Figure 16:
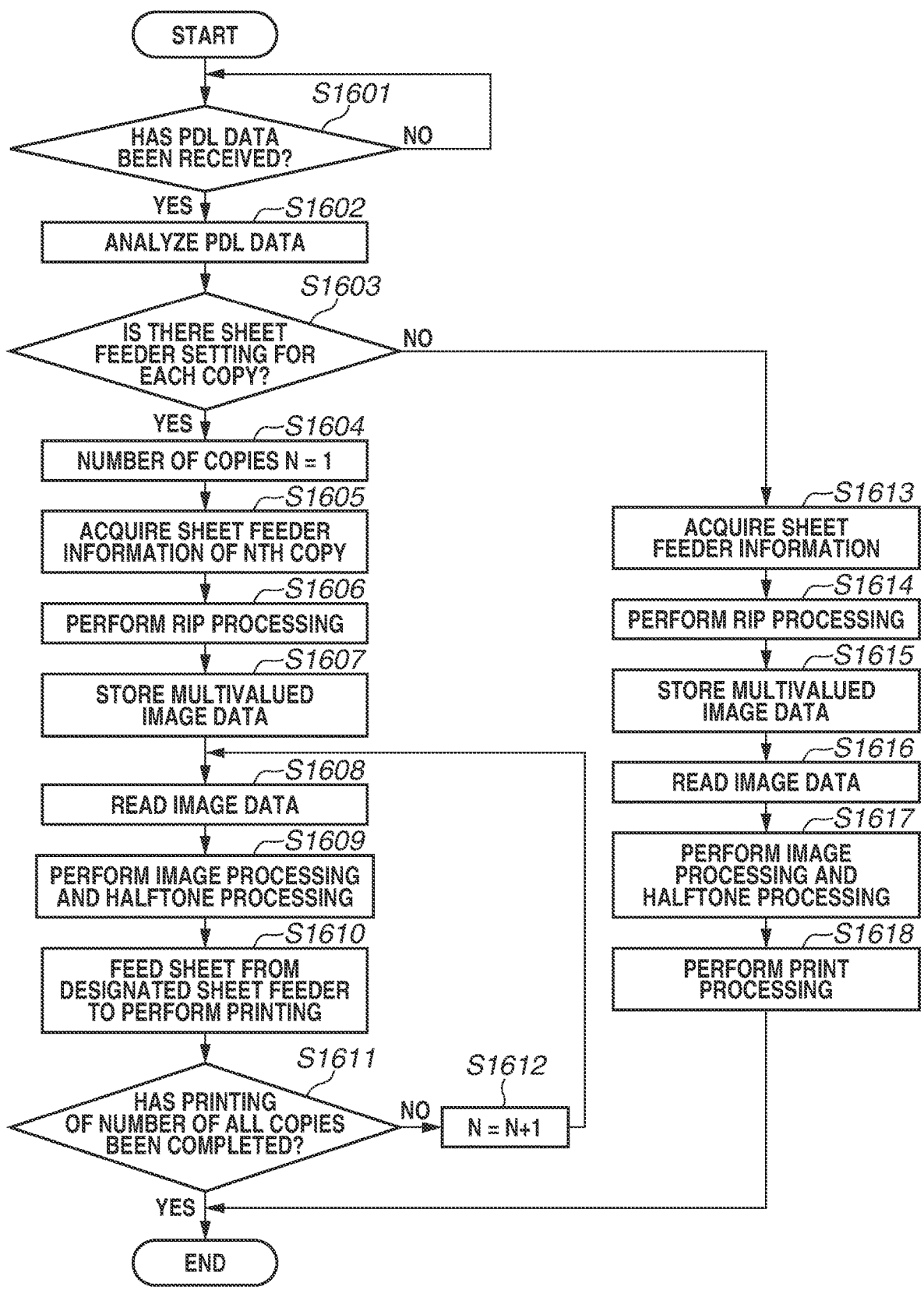
FIG. 16 is a flowchart of operations performed by an image forming apparatus according to still another exemplary embodiment.

FIG. 16 is a flowchart relating to execution of a PDL job in which a sheet feeder is changed on a copy basis according to the still another exemplary embodiment. A control program stored in a storage unit 302 is loaded to a RAM 303 and a CPU 301 executes the loaded program, so that operations in the flowchart illustrated in FIG. 16 are performed.

Since processing in steps from S1601 through S1605, S1608, from S1610 through S1613, S1616, and S1618 is similar to that in respective steps from S1001 through S1005, S1008, from S1010 through S1013, S1016, and S1018 of the flowchart illustrated in FIG. 10, a description thereof is omitted. Hereinafter, processing that differs from that of the flowchart illustrated in FIG. 10 of the first exemplary embodiment will be described.

In step S1606, the MFP 100 performs RIP processing on PDL data to generate multivalued image data. In step S1607, the MFP 100 stores the multivalued image data generated in step S1606 in a storage unit 114. A configuration in which a series of operations of image processing is executed using an image memory 119 instead of using the storage unit 114 may be employed. In such a case, the processing can proceed from step S1606 to step S1609. Subsequently, in step S1609, the MFP 100 performs image processing for controlling a toner amount with respect to the generated multivalued image data based on information (e.g., grammage, surface property, thickness, and application) of sheets arranged in a sheet feeder (a sheet feed cassette) for an Nth copy. Then, the MFP 100 performs halftone processing on the multivalued image data having been subjected to the image processing, thereby converting the multivalued image data into binary image data.

Processing in steps S1614, S1615, and S1617 is substantially the same as that in respective steps S1606, S1607, and S1609, a description thereof is omitted.

Figure 17:
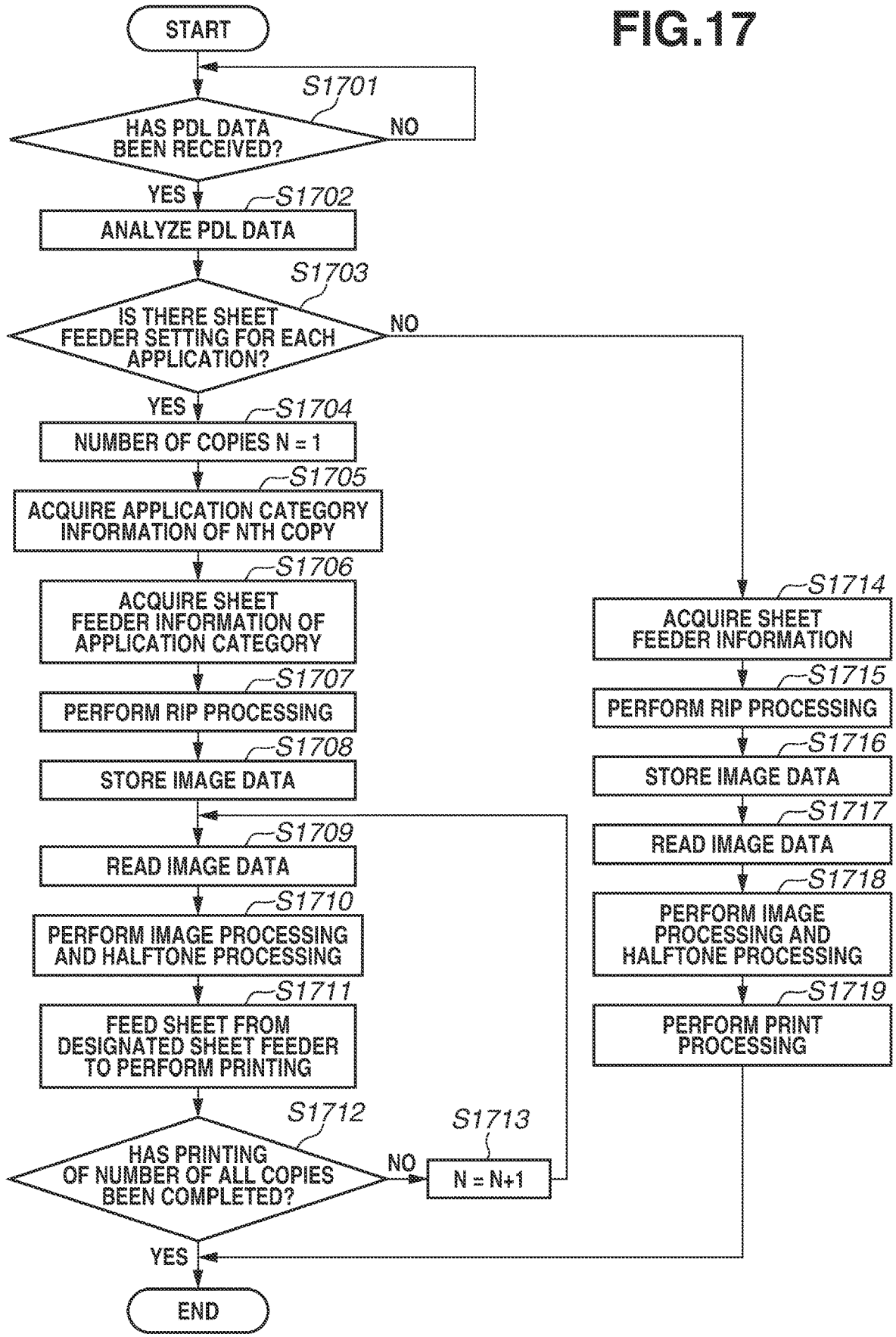
FIG. 17 is a flowchart of operations performed by the image forming apparatus according to the still another exemplary embodiment.

FIG. 17 is a flowchart relating to execution of a PDL job in which a sheet feeder is changed on an application basis by distinguishing main printing and sub printing according to the still another exemplary embodiment. A control program stored in the storage unit 302 is loaded to the RAM 303, and the CPU 301 executes the loaded control program, so that operations in the flowchart illustrated in FIG. 17 are executed.

Since processing in steps from S1701 through S1706, S1709, from S1711 through S1714, S1717, and S1719 is similar to that in respective steps from S1101 through S1106, S1109, from S111 through S1114, S1117, and S1119 of the flowchart illustrated in FIG. 11, a description thereof is omitted. Hereinafter, processing that differs from that of the flowchart illustrated in FIG. 11 of the first exemplary embodiment will be described.

In step S1707, the MFP 100 performs RIP processing on PDL data to generate multivalued image data. In step S1708, the MFP 100 stores the multivalued image data generated in step S1707 in the storage unit 114. A configuration in which a series of operations of image processing is executed using the image memory 119 instead of using the storage unit 114 may be employed. In such a case, the processing can proceed from step S1707 to step S1710. Subsequently, in step S1710, the MFP 100 performs image processing for controlling a toner amount with respect to the generated multivalued image data based on information (e.g., grammage, surface property, thickness, and application) of sheets arranged in a sheet feeder for an Nth copy. Then, the MFP 100 performs halftone processing on the multivalued image data having been subjected to the image processing, thereby converting the multivalued image data into binary image data.

Processing in steps S1715, S1716, and S1718 is similar to that in respective steps S1707, S1708, and S1710 described above. A description of such similar processing is omitted.

Figure 18:
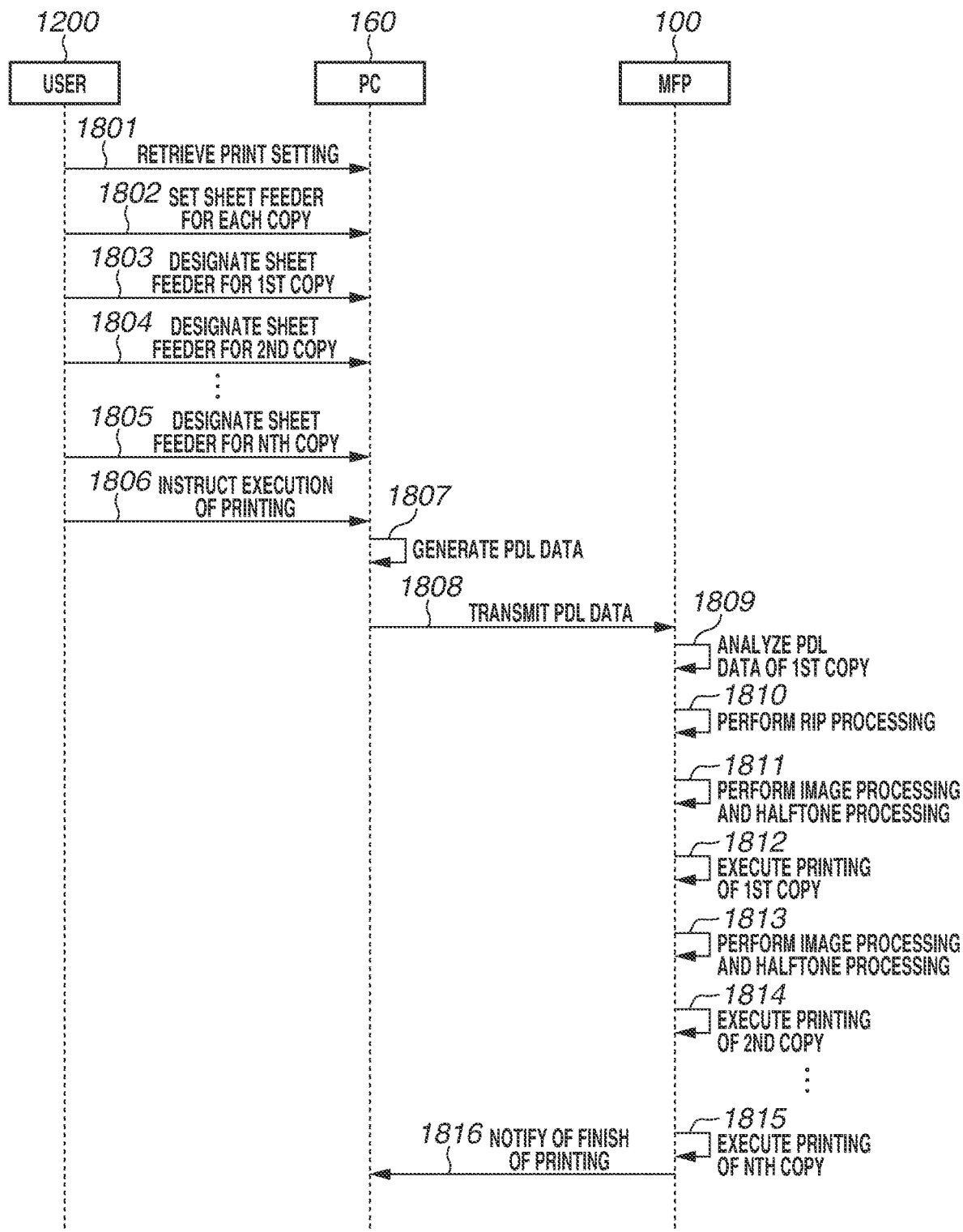
FIG. 18 is a flowchart of operations performed by an entire system according to the still another exemplary embodiment.

FIG. 18 is a flowchart of operations from an operation of the printer driver 400 on the PC 160 by a user to completion of a printing operation by the MFP 100.

In step S1801, a user 1200 activates the printer driver 400 on the PC 160 to start to make a print setting. In steps S1802, S1803, S1804, and S1805, the user 1200 selects a per-copy sheet feeder setting by the printer driver 400, and sets a sheet feeder on a copy basis. In step S1806, the user 1200 issues an instruction for execution of printing by the MFP 100 to the printer driver 400.

In step S1807, the printer driver 400 generates PDL data based on the set print setting. In step S1808, the printer driver 400 transmits the PDL data to the MFP 100. In step S1809, upon receipt of the PDL data, the MFP 100 analyzes the received PDL data. In step S1810, the MFP 100 executes RIP processing based on the PDL data, and stores multivalued image data generated by the RIP processing in the storage unit 114.

In step S1811, the MFP 100 performs image processing on the multivalued image data read from the storage unit 114. Herein, the image processing is performed according to information (e.g., grammage, surface property, thickness, and application) of sheets arranged in a sheet feeder for first copy. In step S1811, the MFP 100 performs halftone processing on the multivalued image data having been subjected to the image processing to convert the multivalued image data into binary image data. In step S1812, the MFP 100 executes printing of the first copy. At this time, a sheet is supplied from the sheet feeder for the first copy set in the PDL data. In steps S1813, 1814, and 1815, the MFP 100 repeatedly executes image reading, image processing, and printing for the number of copies set in the PDL data. In step S1816, upon finish of printing of the number of all copies, the MFP 100 notifies the PC 160 of the finish of printing.

Therefore, if a setting of a sheet feeder that feeds sheets on a copy basis is valid, RIP processing is performed on received PDL data, and multivalued image data having been subjected to the RIP processing is stored in a storage unit. Then, image processing according to a sheet type and printing are repeatedly executed with respect to the image read from the storage unit for the number of copies to be output, so that an image processed according to a sheet to be output can be printed.

From the standpoint of processing time, a configuration of the still another exemplary embodiment in which the number of times of RIP processing is less than that in each of the first exemplary embodiment and the another exemplary embodiment is desired. However, the configuration of the still another exemplary embodiment cannot be employed due to restriction of the image processing unit 118, the storage unit 114, and the RAM 112 if image data needs to be subjected to binary processing before being stored in the storage unit 114. Therefore, the configuration of the first exemplary embodiment or the another exemplary embodiment is employed. The configuration of the another exemplary embodiment can deal with such a case by changing only a printer driver without making a change to the existing MFP.

According to the present exemplary embodiment, even if sheets are fed from different sheet feed cassettes on a copy basis to perform printing, image processing according to types of sheets to be fed from the different sheet cassettes can be performed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments.

This application claims the benefit of Japanese Patent Application No. 2017-194694, filed Oct. 4, 2017, which is hereby incorporated by reference herein in its entirety.

What is claimed is:

1. An image forming apparatus connectable to an information processing apparatus via a network, the image forming apparatus comprising a controller including a processor or circuit, the controller configured to function as:
    a receiving unit configured to receive print data from the information processing apparatus, the print data including setting information in which printing of a plurality of copies including a first copy and a second copy is designated, a first sheet feed cassette is set for printing of the first copy and a second feed cassette is set for printing of the second copy;
    a generation unit configured to generate image data from the print data received by the receiving unit;
    a storage unit configured to store the image data generated by the generation unit;
    a reading unit configured to read the stored image data at least twice, wherein the stored image data is read for a first time for printing of the first copy and read for a second time for printing of the second copy;
    a processing unit configured to perform first image processing on the image data read for the first time according to a sheet type of sheets stored in the first sheet feed cassette and to perform second image processing on the image data read for the second time according to a sheet type of sheets stored in the second sheet feed cassette different from the first sheet feed cassette; and
    a printing unit configured to print image data subjected to the first image processing on a sheet fed from the first sheet feed cassette, and to print image data subjected to the second image processing on a sheet fed from the second sheet feed cassette.

2. The image forming apparatus according to claim 1, wherein the setting information includes information in which at least the first sheet feed cassette is set for printing of the first copy and the second sheet feed cassette is set for printing of the second copy.

3. The image forming apparatus according to claim 1, wherein the image data generated by the generation unit and stored in the storage unit is multivalued image data.

4. The image forming apparatus according to claim 1, wherein each of the first sheet feed cassette and the second sheet feed cassette stores sheets with a type that is any of plain paper, recycled paper, thick paper, and glossy paper.

5. The image forming apparatus according to claim 1, wherein the image processing according to a type of sheets is processing for restricting a toner amount or binarization processing.

6. The image forming apparatus according to claim 1, wherein the image processing according to a type of sheets is performed to all copies with respect to the print data of the plurality of copies.

7. An image forming method in an image forming apparatus connectable to an information processing apparatus via a network, the image forming method comprising:

receiving print data from the information processing apparatus, the print data including setting information in which printing of a plurality of copies including a first copy and a second copy is designated, a first sheet feed cassette is set for printing of the first copy and a second feed cassette is set for printing of the second copy;

generating image data from the print data received by the receiving;

storing the image data generated by the generating in a storage unit;

reading the stored image data at least twice, wherein the stored image data is read for a first time for printing of the first copy and read for a second time for printing of the second copy;

performing first image processing on the image data read for the first time according to a sheet type of sheets stored in the first sheet feed cassette second-processing, based on the image data stored by the storing and the setting information, performing second image processing on the image data read for the second time according to a sheet type of sheets stored in the second sheet feed cassette different from the first sheet feed cassette; and printing image data subjected to the first image processing on a sheet fed from the first sheet feed cassette, and to print image data subjected to the second image processing on a sheet fed from the second sheet feed cassette.

8. The image forming method according to claim 7, wherein the setting information includes information in which at least the first sheet feed cassette is set for printing of the first copy and the second sheet feed cassette is set for printing the second copy.

9. The image forming method according to claim 7, wherein the image data generated by the generating and stored in the storage unit is multivalued image data.

10. The image forming method according to claim 7, wherein each of the first sheet feed cassette and the second sheet feed cassette stores sheets with a type that is any of plain paper, recycled paper, thick paper, and glossy paper.

11. The image forming method according to claim 7, wherein the image processing according to a type of sheets is processing for restricting a toner amount or binarization processing.

12. The image forming method according to claim 7, wherein the image processing according to a type of sheets is performed to all copies with respect to the print data of the plurality of copies.

* * * * *